United States Patent [19]

Mugford

[11] 3,831,355

[45]*Aug. 27, 1974

[54] AIR FILTER ASSEMBLY

[75] Inventor: Charles C. Mugford, Hermosa Beach, Calif.

[73] Assignee: Farr Company, El Segundo, Calif.

[ * ] Notice: The portion of the term of this patent subsequent to Sept., 1991, has been disclaimed.

[22] Filed: Feb. 18, 1972

[21] Appl. No.: 227,442

Related U.S. Application Data

[63] Continuation-in-part of Ser. No. 120,079, March 2, 1971, Pat. No. 3,802,169.

[52] U.S. Cl............... 55/484, 55/521, 210/493, 210/493
[51] Int. Cl............................................. B01d 27/06
[58] Field of Search.................. 55/484, 498, 521

[56] References Cited
UNITED STATES PATENTS

| | | | |
|---|---|---|---|
| 1,714,854 | 5/1929 | Dollinger | 55/484 |
| 3,058,594 | 10/1962 | Hultgren | 55/498 |
| 3,417,551 | 12/1968 | Bonell | 55/521 |
| 3,490,211 | 1/1970 | Cartier | 55/521 |
| 3,631,582 | 1/1972 | Lucas et al. | 55/521 |
| 3,641,744 | 2/1972 | Culbert et al. | 55/521 |

FOREIGN PATENTS OR APPLICATIONS

| | | | |
|---|---|---|---|
| 1,275,496 | 10/1961 | France | 55/484 |
| 1,239,451 | 7/1960 | France | 55/484 |

Primary Examiner—Bernard Nozick
Attorney, Agent, or Firm—Lyon and Lyon

[57] ABSTRACT

A compact filter assembly for providing a large filter area in a relatively small and inaccessible space, the assembly includes a housing having an air inlet and air outlet means with a plurality of filter elements in the housing separating the air ilet and air outlet means. Each filter element includes a pair pleated filter media panels which converge at each end to form a rigid hollow column member. The column member is sealably secured at each end to the housing, with the interior of each hollow column member encircling the air outlet means. Thus, air entering the air inlet of the housing flows radially inward through the panels of filter media into the interior of the column members and axially therefrom through the air outlet means.

12 Claims, 6 Drawing Figures

PATENTED AUG 27 1974

AIR FILTER ASSEMBLY

This Application is a Continuation-in-Part of my U.S. Pat. application No. 120,079 for an Air Filter Assembly filed Mar. 2, 1971 now U.S. Pat. No. 3,802,169 issued Apr. 9, 1974. The invention set forth herein relates to an air filter having a relatively large filter area which is adapted to fit within a relatively small space such as the engine compartment of a truck and which is further adapted to withstand engine vibrations and other stress conditions connected with the operation of a large, high-horsepower engine.

The necessity of filtering the intake air for internal combustion engines to prevent damage and premature wear is well known. For large trucks there are a number of factors which dictate the necessity of providing an intake air filter having high dust-removal efficiency such as: the high cost of the truck engine, the adverse environmental conditions commonly encountered, the high number of operating hours, the expected dependability of engine operation, etc. Moreover, the high volumetric rate of air ingestion of internal combustion engines for large trucks requires the air filter to have high air flow capacity. As a result of these requirements, the conventional air filters for large trucks are usually of such a large size to preclude the mounting of the filter directly on the engine or, in many situations, even within the engine compartment. Thus, ducting must be provided for conducting the air from the filter to the intake which produced an air pressure drop and results in a reduction in engine efficiency. Moreover this ducting is prone to develop leaks and admit unfiltered air to the engine.

There is at least one filter which meets the required filter area necessary for high dust-removal efficiency and is yet sufficiently compact enough to be mounted directly on the engine. This filter is illustrated, described and claimed in the currently pending U.S. Pat. application, Ser. No. 843,587 of Robert M. Culbert and Richard V. Southworth entitled Air Filter for Trucks. While this particular filter overcomes most of the objectionable features of the other larger filter units and is satisfactory for most purposes, it has been found that the direct engine mounting in certain particular instances creates certain additional problems, the most prevalent of which involves a failure of the filter housing which supports and houses the filter cartridge due to a pulsating air flow created in certain high horsepower engines and the engine vibrations which together act on the housing over a long period of time. Another problem involves damage to the filter media seals due to the engine vibrations.

Therefore, it is a principal object of this invention to provide a novel form of intake air cleaner of a sufficiently compact size for mounting in a relatively small space and having a self-contained, durable filter cartridge which is adapted to withstand the pulsating air flow and engine vibrations. A further object of this invention is to provide a large area of filter media arranged in a structurally rigid manner whereby the media is adapted to provide support for the sidewalls of the cartridge. Another object of this invention is to arrange the media in a manner which permits the ends and edges of the media to be sufficiently sealed and resists failure of the seals due to vibrations and other stress conditions.

Still another object of this invention is to provide a compact air filter for large trucks adapted to be mounted directly on the engine air intake comprising a generally flat rectangular cartridge with an air inlet, air outlet means in communication with the engine air intake, and plurality of filter elements in the cartridge separating the air inlet and air outlet means and each including a pair of pleated paper filter media panels which are arranged in a structurally rigid manner. A still further object of this invention is to arrange the pleated filter media of each element in a closed and elongated loop to provide a substantially continuous filter media surface through which air flows having a substantially greater straight portion than curved portion in order to maximize the media surface per the available space and minimize the air pressure drop as air flows through the media.

A still further object of this invention is to provide an air filter which requires no filter cartridge housing or enclosure and which instead comprises a durable, self-contained unit having a filter cartridge which fully protects the paper media during shipping and installation.

Other objects and advantages of this invention will appear from the following description and the accompanying drawings, wherein.

It should be noted that the drawings illustrate a particular form of the air filter of this invention having a specific shape and mounting arrangement specifically adapted to fit one model of truck. However, it will be readily understood by those skilled in the art that by appropriate modifications to the size and shape of the cartridge, flanges, and the like, the air filter assembly of this invention maybe adapted for use in other arrangements with equally advantageous results.

Figure 1:
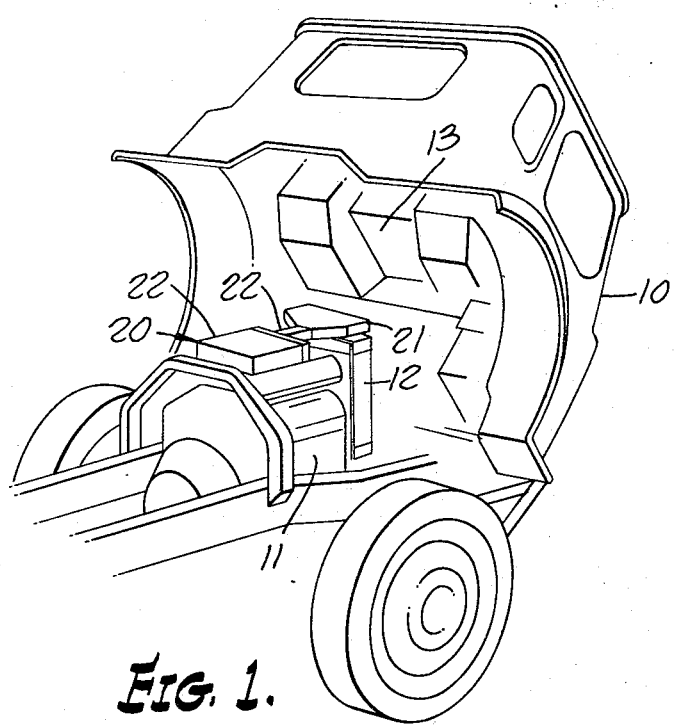
FIG. 1 is a perspective view of the engine compartment of a large truck of the "cab-over" type illustrating the air filter of this invention mounted on top of the engine.
Figure 5:
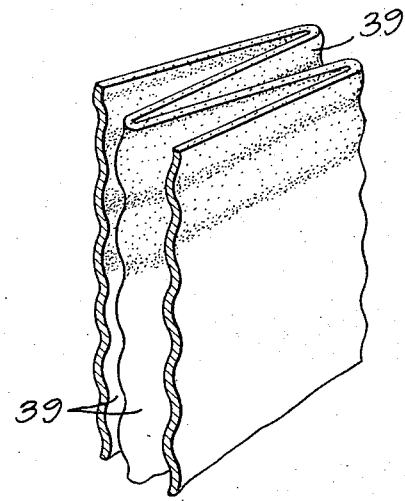
FIG. 5 is an exploded partial view of the pleated filter media illustrating air inlet passages provided in the media.

Referring now more particularly to FIG. 1, the truck is illustrated with the cab 10 in the raised position to expose the engine 11 from the rear. The radiator 12 is positioned immediately in front of the engine. When the cab 10 is lowered into operating position the underside of the cab as viewed in FIGS. 1 and 2 forms the engine compartment and surrounds the engine relatively closely. Part of the engine compartment includes the central engine tunnel portion 13 which from the interior of the cab 10 comprises a substantially raised portion between the driver and passenger positions of the cab. This engine tunnel portion 13 is conventionally sized by the truck manufacturer to provide a minimum clearance between the engine and such portion whereby the engine tunnel portion 13 presents a minimum of obstruction within the cab 10. It is this minimal space between the engine and the walls of the engine compartment including the engine tunnel portion 13 that precludes the installation of larger truck air filters directly on top of the engine or, in several instances, even within the engine compartment.

Figure 2:
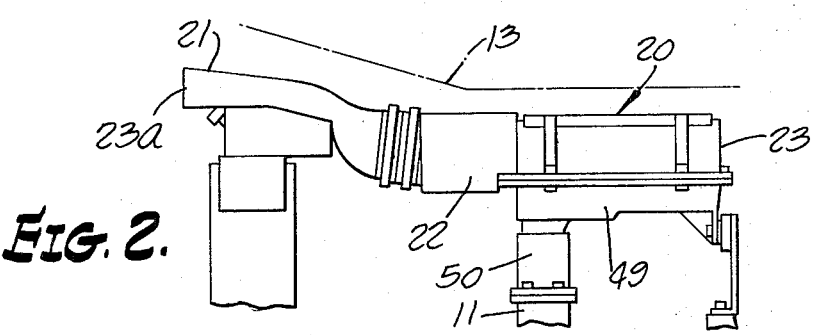
FIG. 2 is side view illustrating the mounting of the air filter in the engine compartment with phantom lines indicating the approximate position of the lower portion of the cab forming the top of the engine compartment.
Figure 6:
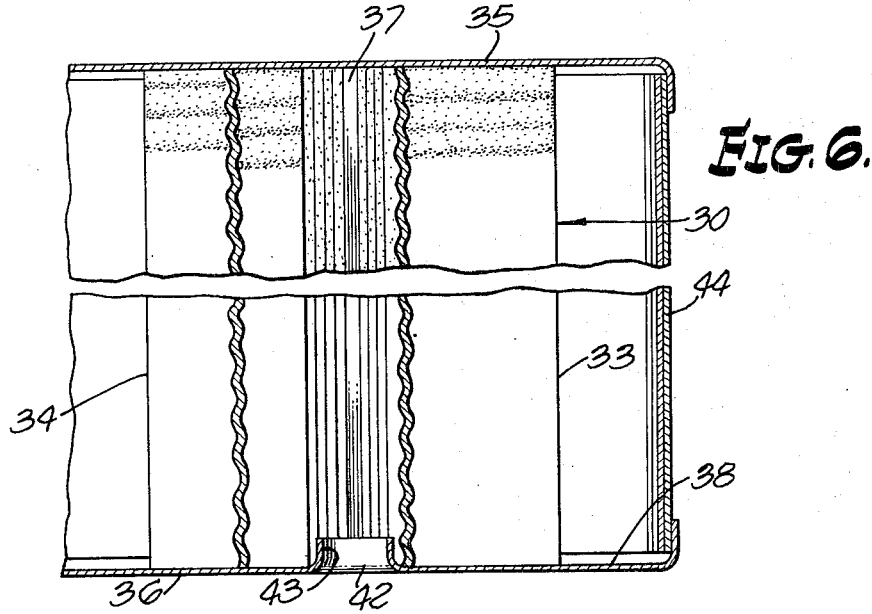
FIG. 6 is an exploded sectional view taken substantially on the lines 6—6 of FIG. 3.
Figure 3:
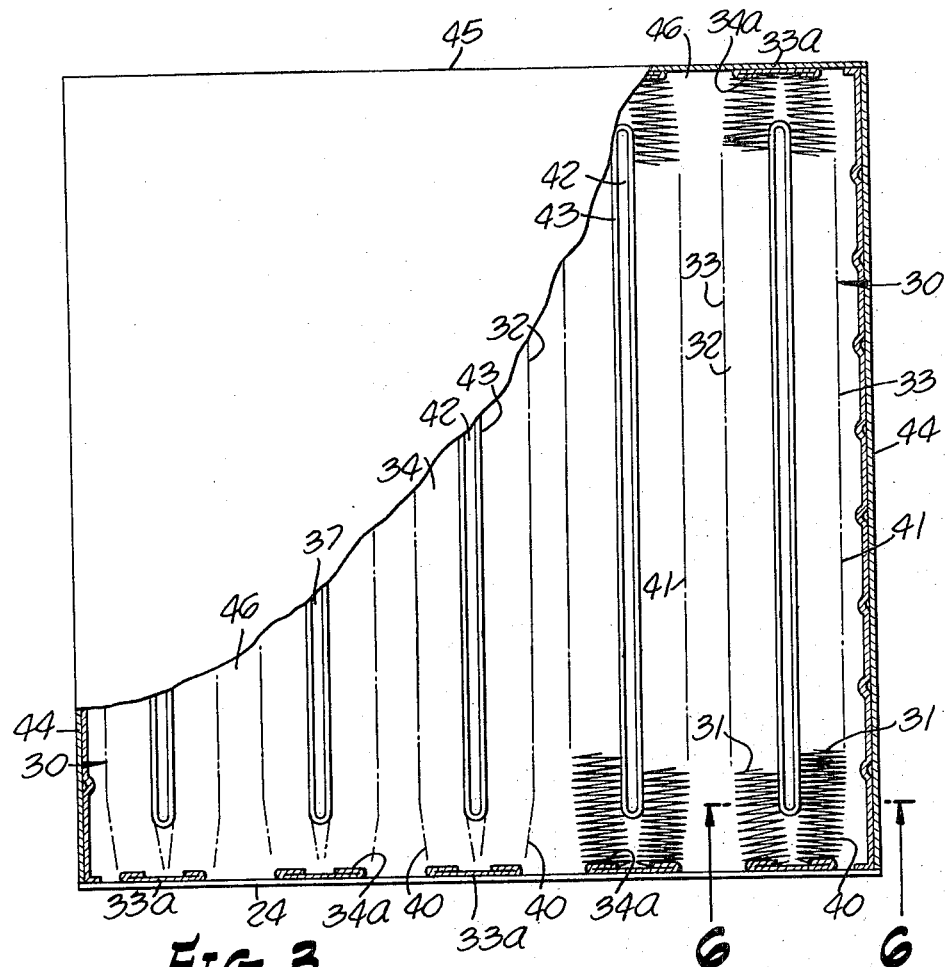
FIG. 3 is a top view with the top of the air filter cartridge partially cut away to illustrate the arrangement of the filter elements.
Figure 4:
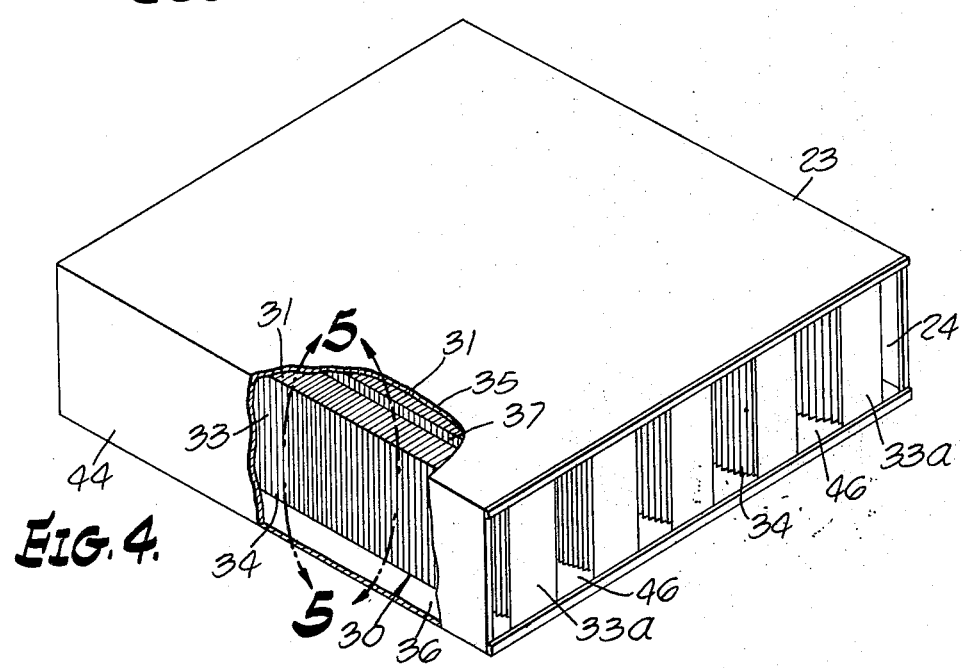
FIG. 4 is a perspective view of the air filter assembly illustrating the air intake with a section broken away to illustrate the arrangement of the filter media.

Referring to both FIGS. 1 and 2, the air filter of this invention is generally designated 20 and is shown mounted in position on the engine 11. The minimal space between the engine 11 and the engine tunnel 13 is diagrammatically shown in FIG. 2 and it is within this space that the compact air filter 20 of this invention is mounted. An air intake duct or scoop 21 extends from an air moisture separator 22 at the front of the housing of the air filter 20 to an air inlet (not shown) at the front of the cab 10. The intake 23a of the scoop 21 is preferably positioned above the radiator 12 to permit intake of the air without it being heated by the radiator 12 and engine 11 prior to introduction to the air filter. Moreover, the provision of this substantially unrestricted air intake at the front of the vehicle produces an advantageous air ram effect which forces air into the engine when the truck is in motion to provide a maximum of air to the engine.

Referring now more particularly to FIGS. 3–6, the air filter 20 of this invention includes a generally rectangular cartridge 23 substantially greater in horizontal width and length than vertical thickness and may be any convenient material such as sheet metal. One end 24 of the cartridge 23 is substantially open to provide an air inlet and this air inlet end 24 is preferably connected to the downstream side of the air moisture separator 22. The air moisture separator 22 is adapted to remove excess moisture in incoming air taken from the extreme front of the truck and which could otherwise damage the media of the filter. For certain applications this moisture separator which forms no part of the present invention, maybe eliminated, although, as indicated, its use is usually preferred.

The required air filtration efficiency without excessive pressure drop through the filter 20 is achieved by a plurality of filter elements, generally designated 30, which, as illustrated, occupy most of the filter housing 23. Each filter element 30 includes a pair of pleated paper filter media panels or strips 31 which converge at each end to form a closed elongated loop 32 and thereby provide a relatively large substantially straight filter media surface 33. Rigid, preferably metal, plates 33a at each end of each loop receive the converging ends of each pair of filter media panels 31 with integral flanges 34a on each side thereof folded over to sealably secure the ends of the panels 31 thereto. The plates 33a are secured to the housing 23 and together with the filter media panels 31 form a structurally rigid hollow column 34 which extends between the top and bottom sidewalls 35 and 36, respectively, of the filter housing 23. The sidewalls 35 and 36, which are structurally supported by the columns 34 serve to insure that all of the air entering the interior 37 of each element 30 from the air inlet 24 must pass radially inward through the filter paper rather than leaking past the ends. To this end the sidewalls 35 and 36 are molded to the elements 30 by a liquid which cures or "hardens" to a relatively soft and flexible plastic or rubber-like material 38 with the ends of the pleated panels of filter paper 31 forming the columns 34 embedded in the material to an adequate depth to insure a complete seal.

Moreover, this flexible materal permits a certain degree of limited movement of the component parts of the filter and also dampens or deadens vibrations or pulses generated by the engine. It should be specifically noted that because of the rigid structural nature of the formed columns 34 that each element 30 can be mounted in stress between the sidewalls 35 and 36, and this serves to support these flat sheet metal sidewalls. Moreover, because the sidewalls of the cartridge can be supported in this manner there is no need to provide a separate housing or enclosure for the cartridge. In addition because the sidewalls are securely supported there will be less of a tendency for the seams of the cartridge to come apart due to the pulsating air flow and engine vibration. Also, because the ends of the columns are sufficiently stiff they aid in the forming of the proper seals and thereby prevent failure of the seals due to engine vibrations or other stresses caused during operating conditions.

As illustrated, the pleated filter media 31 of each element 30 forms a multiplicity of converging and diverging passages 39 through which the air passes as it flows from the housing into the interior 37 of each element 30. Generally throughout each panel of media the passages 39 are uniform. However, it should be noted that if the panels 31 were substantially curved the pleates at the interior of the column would be bunched together and would thereby restrict the passages into the interior 37. Therefore, in order to limit such a restriction of the passages as much as possible and thereby prevent an undesirable air pressure drop, the curve or bend at the converging portions or ends 40 of the media surface 33 is limited and the straight portions or sides 41 of the media surface are extended. This is accomplished by arranging the pairs of pleated media panels a relatively short distance apart in a substantially parallel relationship thereby forming an elongated loop as illustrated where the major axis of the loop is substantially greater than the minor axis of the loop. It is also very important to note that this particular shape tends to maximize the inlet and outlet filter media surface area for the space available. Thus, media in a loop having a substantially greater length than width is distinguished from both an arrangement of media in a single column having circular cross-section and an arrangement of media in a plurality of columns each having a circular cross-section. It is evident that media arranged in a plurality of circular columns in a given space will provide a maximum of inlet filter media surface area, however, because of the dimensional thickness of the strip of pleated media or the distance between the exterior and the interior of the column the desired amount outlet filter media surface area will not be provided. On the other hand, the arrangement of media in a single circular column will provide a maximum of outlet filter media surface area for a particular given space, but it will not provide the desired inlet filter media surface area. Moreover, in order to maintain the desired spacing within the passages 39 the filter paper is preferably corrugated as seen best in FIG. 5 with the corrugations running counter to the pleats. The interference between the various corrugations provides the necessary space in the passages 39.

Bottom sidewall 36 is provided with elongated air outlet openings 42 for aligning with the elements 30 to receive the air from the interior of the elements 30 whereas top sidewall 35 completely closes the end of each filter element 30. A flange 43 adjacent each opening 42 extends into the interior of each hollow column adjacent the media panels and acts to prevent an inward collapse of the hollow columns 34, each of which encircles at one end an outlet opening 42 and flange 43. Thus, with the closed loops of media forming a substantially continuous surface of media around each outlet 42, even if leaks should develop in the seams of the filter cartridge the air will still be required to pass through the filter media before exiting out through an outlet.

The filter elements 30 are completely enclosed by the sheet metal sidewalls 44 and a sheet metal end wall 45 of the cartridge and thus protected during shipping and installation. The filter elements 30 are arranged parallel to each other in the cartridge 23 and spaced apart to provide passageways 46 therebetween. The filter elements 30 extend longitudinally from the air inlet end 24 to the rear end 45 of the cartridge, with the sraight side portions 41 of the media surface 33 extending substantially parallel to the incoming air flow and the converging end portions 40 of each element 30 extending to the plates 33a.

The plates 33a at the inlet end 24 serve to direct the air into the passageways 46 and protect the filter media during handling. The plates 33a at the rear end 45 secure the filter panels thereto.

The filter cartridge 23 is adapted to be mounted on an outlet plenum 49 which encloses the entire bottom sidewall 36 and thus the outlet openings 42. The plenum 49 is in turn provided with outlets 50 which communicate directly to the engine air intake. The plenum 49 serves to conduct the filtered air from the air outlets 42 to the engine intake with a minimum pressure drop.

Thus, in operation the air enters at the front of the cab 10, passes through the air intake duct or scoop 21, and the moisture separator 22 into the air inlet of the cartridge 23. The air is then directed into the passageways 46 between the filter elements 30 and along the filter media surface whereupon the air flows radially inward through the columnar filter paper into the interior of the elements and then axially out through the air outlet openings 42 into the outlet plenum 49.

It is evident that by this invention there is provided a novel form of air filter particularly adapted to provide a high volmetric capacity of air filtration such as required by large truck engines and yet occupy only a comparatively small space as is typically available in such truck engine compartments. The filter of this invention is adapted for direct mounting on an engine air intake to minimize the ducting and resultant inefficiencies involved with air filters mounted at a remote location on the truck and at the same time is adapted to withstand the vibrations and other severe operating conditions which accompany such a mounting arrangement. Specifically, the filter elements each include a pair of pleated paper filter media panels arranged in a closed loop to provide a large substantially continuous surface of filter media and a structurally rigid element which can be mounted in stress between the sidewalls of the housing to protect against damage or failure of the cartridge which encloses the filter media.

Having fully described my invention, it is to be understood that I do not wish to be limited to the details herein set forth, but my invention is of the full scope of the appended claims.

I claim:

1. A filter assembly, comprising:
    a filter cartridge having spaced top and bottom sidewalls, two sidewalls extending between said spaced top and bottom sidewalls, an endwall, and a first air passage means, said first air passage means being positioned between said spaced top and bottom sidewalls;
    a plurality of hollow columnar filter elements enclosed by said filter cartridge and extending between said top and bottom sidewalls to provide structural support thereto whereby said cartridge is adapted to withstand vibration and flow pulsations, each said columnar filter element being in the form of a loop and including pleated filter media and at least one protective plate for covering the junction of a pair of otherwise free ends of said media, said hollow columnar filter elements being stressed in compression between said top and bottom sidewalls and said filter media of said filter elements extending between said top and bottom sidewalls and perpendicular thereto;
    a plurality of second air passage means in said bottom sidewall;
    each said loop providing a substantially large area of filter media and surrounding one of said second air passage means and each loop being radiused at the front of said cartridge to provide greater inlet area and promote undisturbed air flow; and
    said ends of each said hollow columnar filter element being flexibly and sealably connected to said top and bottom sidewalls whereby flowing between said first and second air passage means flows radially through said filter elements.

2. The filter assembly of claim 1, wherein said pleated media provides a multiplicity of diverging and converging passageways for communication of air into the interior of said column, said media being corrugated with said corrugations running contra to said pleats whereby the interference between said corrugations maintains a desired spacing in said passageways.

3. The filter assembly of claim 1, wherein said cartridge means is provided with a flange support adjacent said air outlet means, said flange support adapted to support the filter media at the interior of said hollow column and prevent an inward collapse thereof.

4. The filter assembly of claim 1, wherein protective plates are provided at each end of said loop.

5. The filter assembly of claim 1, wherein said protective plates are substantially more rigid than said media.

6. The filter assembly of claim 1, wherein the length of said loop is substantially greater than the width of said loop.

7. A filter assembly, comprising:
    a filter cartridge having spaced top and bottom sidewalls, two sidewalls extending between said spaced top and bottom sidewalls, an endwall, and a first air passage means, said first air passage means being positioned between said spaced top and bottom sidewalls;
    a plurality of hollow columnar filter elements enclosed by said filter cartridge and extending between said top and bottom sidewalls to provide structural support thereto whereby said cartridge is adapted to withstand vibration and flow pulsations, each said columnar filter element including a pair of pleated paper filter media panels with spaced substantially straight sides and converging ends and a pair of protective plates each plate covering a junction of said converging ends of said panels, said plates and said panels of each said filter element defining an elongated loop, said hollow columnar filter elements being stressed in compression between said top and bottom sidewalls and said filter media of said filter elements extending between said top and bottom sidewalls and perpendicular thereto;

a plurality of second air passage means in said bottom sidewall each said loop providing a substantially large area of filter media and surrounding one of said second air passage means and each loop being radiused at the front of said cartridge to provide greater inlet area and promote undisturbed air flow; and said ends of each said hollow columnar filter element being flexibly and sealably connected to said top and bottom sidewalls whereby air flowing between said first and second air passage means flows radially through said filter elements.

8. The filter assembly of claim 7, wherein said second air passages each comprise an elongated opening in said bottom sidewall with a flange member adjacent said elongated opening and extending into the interior of said hollow columnar filter element around said opening to support said media thereof.

9. The filter assembly of claim 7, wherein each said plate extends the length of said columnar filter element, receives said converging ends of said filter media panels, and includes means for clamping said converging ends sealably thereto to close said loop.

10. The filter assembly of claim 7, wherein said pleated media of each said filter element provides a multiplicity of diverging and converging passageways, for the communication of air flow through said filter elements, said media being corrugated with said corrugations running counter to said pleats to maintain a desired spacing in said passageways.

11. The filter assembly of claim 7, wherein said filter elements are positioned in said cartridge means with said straight sides being parallel and forming air passageways therebetween which extend longitudinally from said first air passage means.

12. The filter assembly of claim 11, wherein said converging ends of said loop at said first air passage means are received by plates which extend the length of said column and which distribute the incoming air flow into said passageways.

* * * * *

UNITED STATES PATENT OFFICE
CERTIFICATE OF CORRECTION

Patent No. 3,831,355           Dated August 27, 1974

Inventor(s) CHARLES C. MUGFORD

It is certified that error appears in the above-identified patent and that said Letters Patent are hereby corrected as shown below:

In the Notice of the Title page, the Notice should be corrected by deleting "Sept." and inserting therefor --Apr.--.

In claim 1, column 6, line 36, after whereby the word --air-- should be inserted.

Signed and sealed this 4th day of February 1975.

(SEAL)
Attest:

McCOY M. GIBSON JR.          C. MARSHALL DANN
Attesting Officer            Commissioner of Patents